Patented Oct. 8, 1929

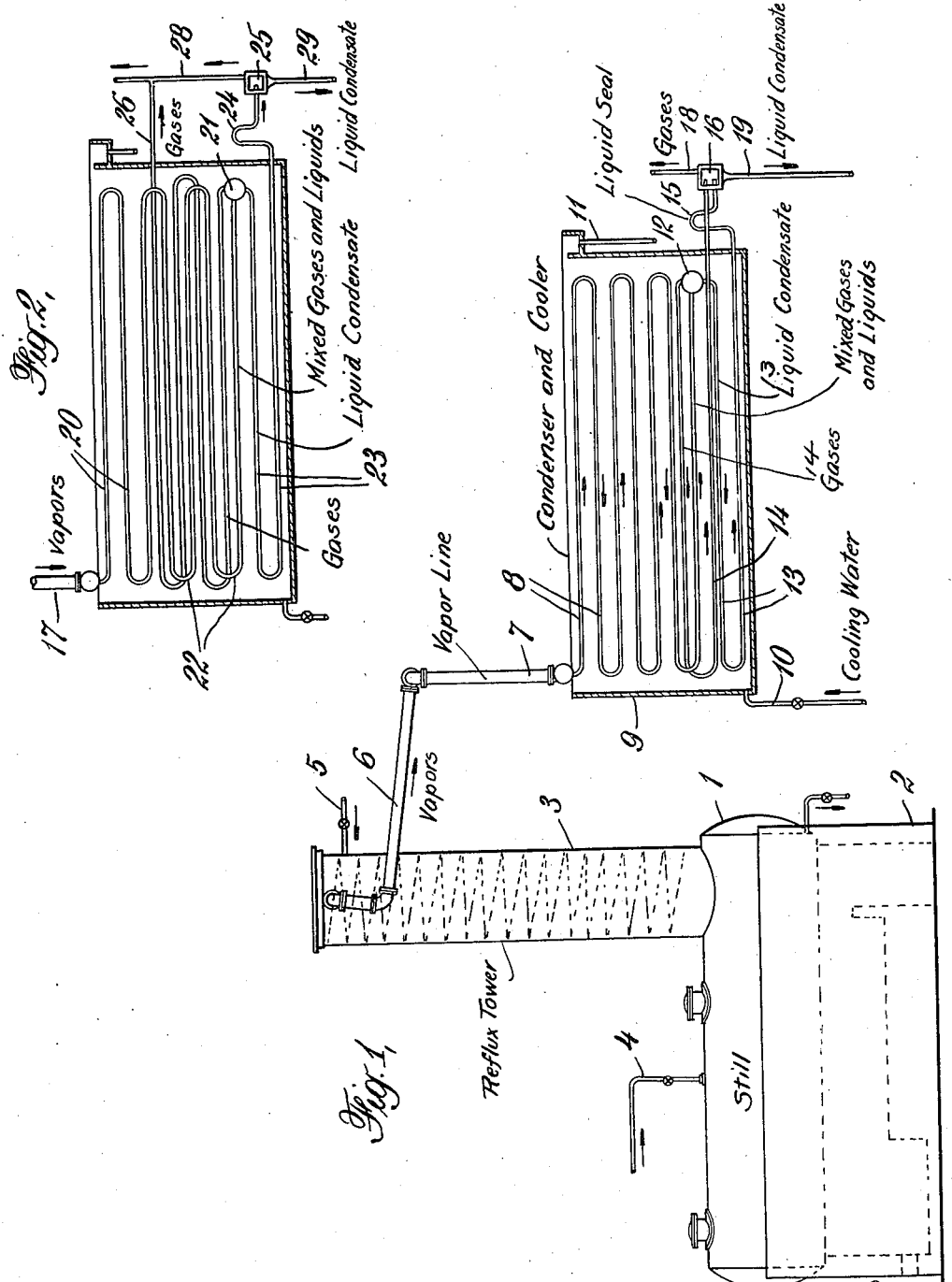

1,730,350

UNITED STATES PATENT OFFICE

JOHN E. BELL, DECEASED, LATE OF BROOKLYN, NEW YORK, BY LOLA R. BELL, EXECUTRIX, OF BROOKLYN, NEW YORK, ASSIGNOR TO SINCLAIR REFINING COMPANY, OF NEW YORK, N. Y., A CORPORATION OF MAINE

APPARATUS FOR CONDENSING HYDROCARBON VAPORS

Application filed January 22, 1925. Serial No. 3,988.

This invention relates to an improved apparatus for condensing the vapors and cooling the condensed distillates from stills in which hydrocarbon oils are subjected to distillation.

In condensing and cooling the vapors and distillates from oil stills, heat is abstracted from the hot vapors escaping from the still to cool the vapors, to condense the vapors, and further to cool the condensate to a final temperature below the temperature of condensation. The distilled products escaping from oil stills always include, although in varying amount, some fixed gases. In the methods hitherto generally employed, the sensible heat of cooling water has been used to effect the cooling and condensation of the oil vapors, and the cooling and condensing operation has been carried out in a single receptacle so that as condensate formed further cooling and condensation involved heat transfer to a mixture of vapors, liquids and gases. Due to the presence of fixed gases, even the final cooling of the condensate is commonly carried out while the distillate is admixed with gases, but there are several difficulties incident to the transfer of heat from such mixtures as well as mechanical difficulties involved in handling such mixtures. In the ordinary tubular type of condenser commonly employed, the condensate as formed collects in the lower part of the tubes where it trickles to the discharge outlet, only a relatively small area of the heat transferring surface being effective for cooling the condensate. In the methods hitherto used, it has been necessary to discharge the cooling water from the condenser at relatively low temperature and to employ relatively large volumes of cooling water to maintain the desired low final temperature. Moreover, the cooling of the condensate to the desired final temperature is usually the factor controlling the amount of cooling water employed and the amount of heat transferring surface required, so that it has been impossible to realize the full benefit from other economies effected in cooling and condensing the vapors.

Among the objects of the present invention are to provide an improved apparatus for condensing and cooling the vapors and distillates from oil stills in which the difficulties incident to the absorption of heat from mixtures of gases, vapors and liquids, or of gases and liquids are overcome or minimized, and in which an improvement in the economy of cooling water employed is effected without sacrifice as to the final temperature of the condensate or of the gases escaping uncondensed.

According to the process of the present invention, the oil vapors from the still are cooled and condensed, the fixed gases and liquid condensate are then separated, and the separated condensate and fixed gases are subjected to a further cooling operation, whereby the efficiency and economy of the combined cooling and condensing operations are increased. The liquid condensate is thus further cooled with improved efficiency because the heat transfer is effected simply from the liquid unmixed with gases, while the further cooling of the gases reduces the final temperature at which they are discharged and assists in promoting the complete condensation and recovery of any uncondensed vapors mixed with the gases. The separation of the gases from the liquid condensate before the final cooling of the gases also improves the efficiency of this cooling, and condensing, operation and further promotes effective condensation of all condensable constituents. The original condensate and any additional condensate produced on further cooling of the gases after separation from the original liquid condensate may be collected together. Due to the increased efficiency of the heat transferring operations after initial separation of the liquid condensate and the gases and any uncondensed vapors, a marked economy in overall consumption of water may be obtained. A lower final temperature both of the condensed distillate and of the fixed gases may thus be obtained with the same amount of cooling water or the same final temperatures may be obtained with a reduced amount of cooling water while at the same time more complete recovery of all condensable constituents may also be obtained because of the improved efficiency of the combined operation.

In the improved apparatus of the present invention, means are provided to effect a separation between liquid condensate and uncondensed gases after initial cooling and condensing treatment and to discharge the separated gases and liquids through additional cooling means, the liquid cooling means being arranged so as to be maintained completely full of the liquid condensate and means being provided to collect any additional condensate formed in the gas cooling means. The improved condenser of the invention may with advantage take the form of a tubular water cooled condenser discharging into a separator with further cooling tubes through which the gases and liquids are separately conducted, a liquid seal being provided in the liquid cooling tubes for maintaining them full of liquid. The main condenser tubes and the additional gas and liquid cooling tubes may all be arranged in the usual condenser box to which cooling water is supplied. The gas and liquid cooling coils may be arranged to discharge into a common look box or separator or the gas cooling coils may be arranged to drain back into the initial separator any condensate formed therein.

The invention will be further described in connection with the accompanying drawings illustrating, somewhat diagrammatically and conventionally, apparatus embodying the invention, but it will be understood that the invention is exemplified by this further description and illustration and is not limited thereto.

In the accompanying drawings:

Fig. 1 represents, in elevation and partly in section, a still and a condenser embodying the invention, and Fig. 2 represents a similar view of a modified arrangement of a condenser embodying the invention.

The still illustrated in the drawing is of the direct fire heated type and comprises a shell 1 arranged over a setting 2. Arranged above the still shell is a reflux tower 3. The reflux tower illustrated is of the general construction and operation described in a prior application filed April 1, 1924, Serial No. 703,338. The still is provided with a charging line 4, and connection 5 is arranged at the upper end of the tower for introducing feed into the still through the tower. The vapors escape from the top of the tower through vapor connections 6.

Referring to Fig. 1, the vapors escaping from the tower on the still enter the condenser through connection 7. In the condenser, the vapors, and condensate as it is formed, flow downwardly through a series of pipe coils 8 in indirect heat exchanging relation with cooling water in which they are immersed in the condenser box 9. Cooling water enters the condensing box through connection 10 and overflows therefrom through connection 11. The pipe coils 8 discharge into the separator 12 in which a separation between the liquid condensate and the uncondensed vapors and gases is effected. From the separator 12 the uncondensed vapors and gases flow downwardly through the pipe coils 14 where they are further brought into indirect heat exchanging relation with the cooling water. The liquid condensate flows from the separator 12 through the pipe coils 13 which are provided with a liquid seal 15 arranged so that the pipe coils 13 are at all times maintained full of condensate. The pipe coils 13 and 14 both discharge into a separator or look box 16 from which the gases escape through vent 18, the cooled liquid condensate flowing through connection 19 to a run down tank or other receiver.

In operation, the hot vapors are cooled to the temperature of condensation and are condensed in the condensing coils 8 and the resulting mixture of condensate and fixed gases is then separated. The liquid condensate then flows through the cooling coils 13 wherein it is cooled to the desired final temperature to the separator 16. The gases from the separator 12 flow through the cooling coils 14 where they are further cooled and any condensable vapors mixed therewith condensed. The cooling coils 14 also discharge into the separator 16 and any condensate formed therein mingles with the stream of condensate discharged from the cooling coils 13.

Referring to Fig. 2, the vapors from the still enter the condenser through connection 17. In the condenser, the vapors, and condensate as it is formed, flow downwardly through a series of pipe coils 20 in indirect heat exchanging relation with the cooling water in the condenser box. The pipe coils 20 discharge into the separator 21 where the liquid condensate and the uncondensed vapors and gases are separated, the gases and any uncondensed vapors flowing through pipe coils 22 where they are further cooled, any additional condensate draining back into the separator 21. From the separator 21 the liquid condensate flows downwardly through the pipe coils 23 where it is cooled to the desired final temperature, the liquid seal 24 being provided to maintain the pipe coils 23 full of liquid condensate. The cooling coils 23 discharge into the look box 25 from which any gases escape through the vent 28. The cooled liquid condensate flows through connection 29 to a run down tank or other receiver. The cooling coils 22 are also arranged to discharge the cooled gases into the vent 28 through connection 26.

The area of heat transferring surface provided in the several cooling and condensing coils of the improved condenser of the invention may vary with the character of the vapors or vapor mixture to be condensed and is also somewhat dependent upon the temperature of the available cooling water. The total surface of the initial condensing coils should be sufficient to condense substantially all of the desired condensable constituents and the surface of the liquid cooling coils sufficient, in conjunction with the initial condensing coils, to cool the condensate to the desired final temperature. The total surface of the gas cooling coils should be sufficient to cool the gases to the desired final temperature and to substantially completely condense any remaining condensable constituents admixed therewith, and the required amount of gas cooling surface may also vary with the proportion of fixed gases present in the vapor mixture. Where the condenser is employed in conjunction with a rerun still or a crude still, for example, the gas cooling surface may be relatively, for example smaller than the liquid cooling surface; and where the condenser is employed in conjunction with a cracking still, for example, or where there is a high proportion of fixed gases, the gas cooling surface may be relatively large.

What is claimed as new and desired to be secured by Letters Patent of the United States is:

1. In combination with an oil still, a condenser, said condenser comprising means for initially cooling and condensing the vapors from the still, means for separating the liquid condensate from the uncondensed vapors and gases, separate means for further cooling both the separated liquid condensate and the uncondensed vapors and gases, a liquid seal adapted to maintain full of liquid the cooling means in which the separated liquid is further cooled, and common means for collecting the liquid condensate from each of the second mentioned separate cooling means.

2. A water cooled condenser, comprising a condenser box with means for supplying cooling water thereto, a separator and cooling coils arranged below the normal water level in the box to drain into the separator, a vapor connection to the cooling coils, additional cooling coils arranged below the normal water level in the box and communicating with the upper part of the separator, and additional cooling coils arranged below the normal liquid level in the box and communicating with the lower part of the separator, the last mentioned cooling coils also communicating with a liquid seal adapted to maintain them full of liquid back to the separator.

3. A water cooled condenser, comprising a condenser box with means for supplying cooling water thereto, a separator and cooling coils arranged below the normal water level in the box to drain into the separator, a vapor connection to the cooling coils, additional cooling coils arranged below the normal water level in the box and communicating with the upper part of the separator, additional cooling coils arranged below the normal liquid level in the box and communicating with the lower part of the separator, the last mentioned cooling coils also communicating with a liquid seal adapted to maintain them full of liquid back to the separator, and a common connection between the outlets of the additional cooling coils.

In testimony whereof I affix my signature.

LOLA R. BELL,
*Executrix of the Last Will and Testament of John E. Bell, Deceased.*